US010737755B2

(12) United States Patent
Hitchcock

(10) Patent No.: US 10,737,755 B2
(45) Date of Patent: Aug. 11, 2020

(54) WICKING MOISTURE CONTROL APPARATUSES AND METHODS OF USING SAME

(71) Applicant: THE BOEING COMPANY, Chicago, IL (US)

(72) Inventor: Cory M. Hitchcock, Granite Falls, WA (US)

(73) Assignee: THE BOEING COMPANY, Chicago, IL (US)

(*) Notice: Subject to any disclaimer, the term of this patent is extended or adjusted under 35 U.S.C. 154(b) by 841 days.

(21) Appl. No.: 15/293,005

(22) Filed: Oct. 13, 2016

(65) Prior Publication Data

US 2018/0105251 A1    Apr. 19, 2018

(51) Int. Cl.
*B64C 1/06*    (2006.01)
*B64D 11/00*    (2006.01)

(52) U.S. Cl.
CPC ............ *B64C 1/067* (2013.01); *B64D 11/003* (2013.01); *Y02T 50/46* (2013.01)

(58) Field of Classification Search
CPC ............ B64C 1/066; B64C 1/067; B64C 1/40
See application file for complete search history.

(56) References Cited

U.S. PATENT DOCUMENTS

| | | | | |
|---|---|---|---|---|
| 1,561,650 A | * | 11/1925 | Lashar | C11D 7/5022 95/231 |
| 2,525,307 A | * | 10/1950 | Luttman | B64D 13/02 244/117 R |
| 3,867,244 A | * | 2/1975 | Adams | B64C 1/067 428/182 |
| 5,577,688 A | * | 11/1996 | Sloan | B64C 1/067 244/117 R |
| 6,531,206 B2 | | 3/2003 | Johnston et al. | |

(Continued)

FOREIGN PATENT DOCUMENTS

| | | |
|---|---|---|
| EP | 1358064 A2 | 11/2003 |
| WO | 2003097344 A1 | 11/2003 |

OTHER PUBLICATIONS

Article entitled: Controlling Nuisance Moisture in Commercial Airplanes in Aero 05 (QTR__Jan. 1999) (available at: http://www.boeing.com/commercial/aeromagazine/articles/2015_q1/archive.html) Jan. 1999.

(Continued)

*Primary Examiner* — Richard R. Green
(74) *Attorney, Agent, or Firm* — Coats & Bennett, PLLC

(57) ABSTRACT

A moisture control apparatus for use with a structure within an aircraft fuselage, the structure including an upper surface, the apparatus comprising: a moisture absorbing layer including a moisture absorbing material, the layer including a leading edge, a trailing edge, side edges, an upper surface, and, a lower surface; and, a wicking layer disposed in fluid communication with the lower surface of the moisture absorbing layer, the wicking layer including a wicking layer leading edge, a wicking layer trailing edge and a wicking layer upper surface configured for capillary action of moisture from the wicking layer trailing edge towards the wicking layer leading edge, wherein the wicking layer leading edge is offset from the leading edge of the moisture absorbing layer such that an offset portion of the wicking layer is exposed to air to facilitate evaporation of the moisture.

20 Claims, 13 Drawing Sheets

(56) References Cited

U.S. PATENT DOCUMENTS

| | | | |
|---|---|---|---|
| 6,746,567 B2 | 6/2004 | Johnston et al. | |
| 6,803,090 B2 | 10/2004 | Castiglione et al. | |
| 8,844,158 B2* | 9/2014 | Dehn | A61F 13/00008 |
| | | | 156/305 |
| 10,023,286 B2* | 7/2018 | Dickson | B64C 1/067 |
| 2003/0102076 A1 | 6/2003 | Johnston et al. | |
| 2003/0104170 A1 | 6/2003 | Johnston et al. | |
| 2013/0185843 A1* | 7/2013 | Rahm | A42C 5/00 |
| | | | 2/181 |
| 2017/0197698 A1* | 7/2017 | Irwin | B64C 1/067 |

OTHER PUBLICATIONS

"Self-Adhering Sheet Flashing" (http://www.protectowrap.com/static-content/pdf/specdata/psds-specdata.pdf) 2007.

Webpage Condensation Management Film 2 X 60 YD Blue http://www.3m.com/3M/en_US/company-us/all-3m-products/~/Condensation-Management-Film-2-x-60-yd-lue?N=5002385+8709314+8769339+8710653+8710714+8711017+8730415+3292209895&rt=rud Sep. 20, 2016.

Webpage http://multimedia.3m.com/mws/media/1072868O/3m-condensation-management-data-sheet.pdf 2015.

* cited by examiner

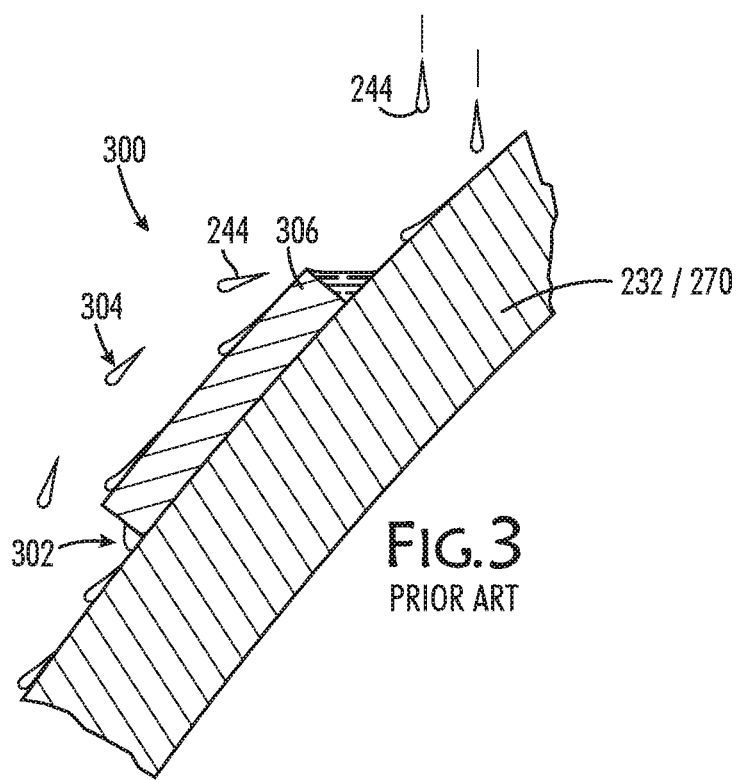

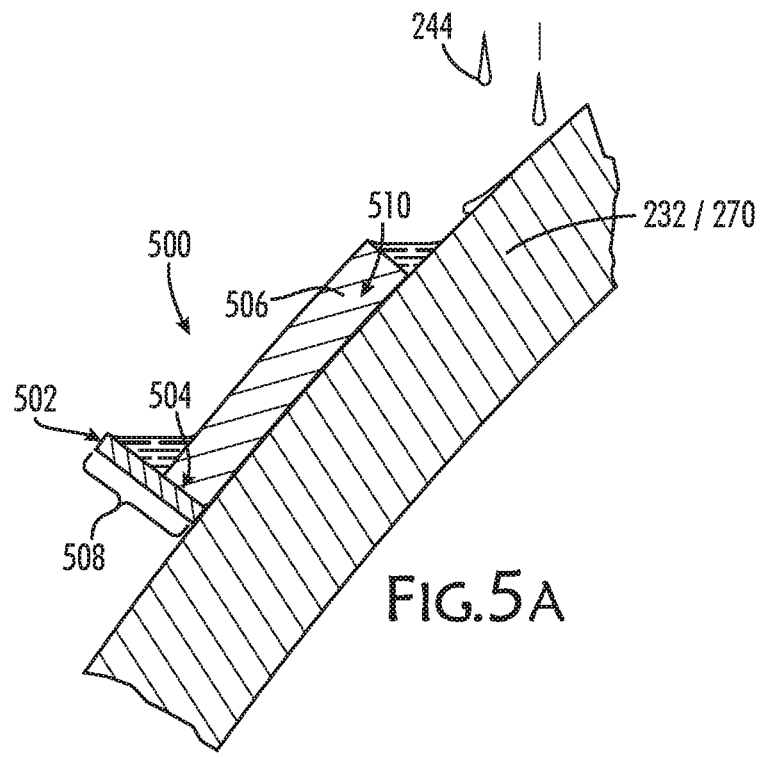
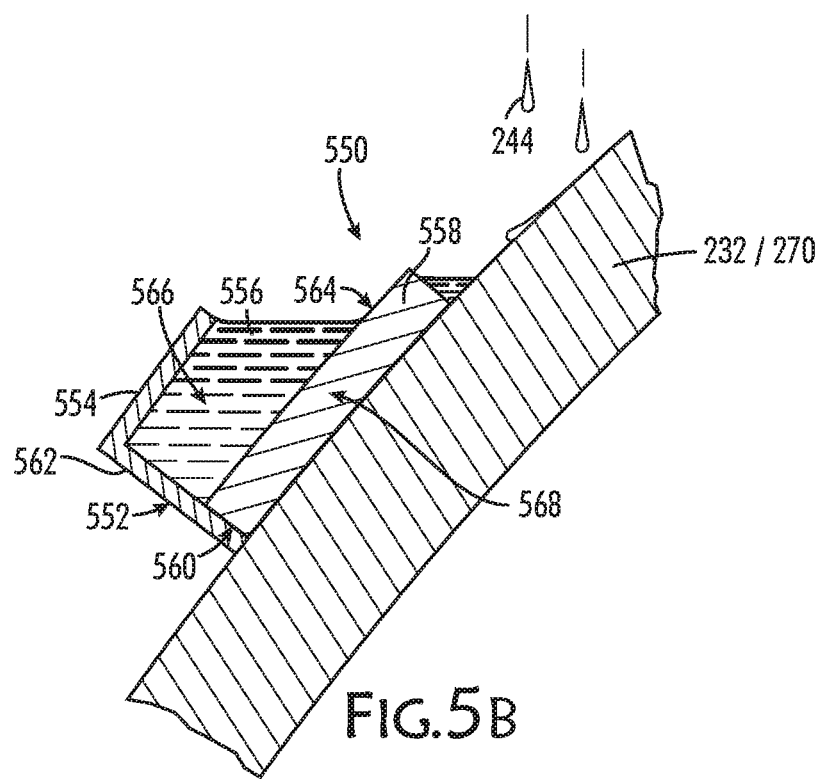

WICKING MOISTURE CONTROL APPARATUSES AND METHODS OF USING SAME

FIELD

The present disclosure generally relates to the moisture control field. More particularly, the present disclosure relates to the field of moisture control in a vehicle.

BACKGROUND

In an aircraft, the outer skin is spaced from the walls and ceiling of a passenger cabin (or other compartment). During a flight, moisture from moist air in the space can condense against the skin and freeze during cruise. During descent, this frozen moisture can thaw and drip back down towards the cabin. The moisture can pass through insulation and other layers, including the passenger cabin ceiling and stowage bins, resulting in the moisture dripping into the passenger cabin.

FIG. 3 is a side view of a prior art moisture control apparatus 300. Conventionally, the moisture control apparatus comprises a moisture absorbing layer 306, for example felt (for example, BMS8-242 Aramid felt, sized ¼ in. ×1.0 in.), the lower surface of which is applied to the upper surfaces of aircraft structures, for example those forming the cabin, such as on the upper surfaces of the ceiling 232 and stowage bins 270. In practice, when moisture drips from an upper portion of the fuselage onto the upper surfaces of the cabin, the moisture control apparatus 300 will usually absorb the moisture droplets 244. However, if too much moisture falls in a single area, the moisture control apparatus 300 can become saturated locally and further moisture droplets 244 added to the moisture absorbing layer 306 will leak 302 out a trailing edge of the felt, such as shown in the prior art view of FIG. 6A.

Additionally, on steeply angled surfaces, moisture droplets 244 can be moving rapidly when the droplets 244 contact the moisture absorbing layer 306. This can cause the moisture droplets 244 to jump 304 over the moisture absorbing layer 306 before the droplets 244 have a chance to be absorbed.

BRIEF SUMMARY

There is provided, a moisture control apparatus for use with a structure within an aircraft fuselage, the structure including an upper surface, the apparatus comprising: a moisture absorbing layer including a moisture absorbing material, the moisture absorbing layer including a leading edge, a trailing edge, side edges, an upper surface, and, a lower surface; and, a wicking layer disposed in fluid communication with the lower surface of the moisture absorbing layer, the wicking layer including a wicking layer leading edge, a wicking layer trailing edge and a wicking layer upper surface configured for capillary action of moisture from the wicking layer trailing edge towards the wicking layer leading edge, wherein the wicking layer leading edge is offset from the leading edge of the moisture absorbing layer such that an offset portion of the wicking layer is exposed to air to facilitate evaporation of the moisture.

In an aspect, the wicking layer is configured with a plurality of alternating ridges and troughs substantially oriented in a direction substantially transverse to a major axis of the wicking layer.

In an aspect, the moisture control apparatus further comprises an adhesive layer between the lower surface of the moisture absorbing layer and the upper surface of the wicking layer coupling the moisture absorbing layer and the wicking layer together and configured to enable fluid communication between the moisture absorbing layer and the wicking layer.

In an aspect, the adhesive layer has a predetermined pattern in which the wicking layer is in fluid communication with the moisture absorbing layer at certain areas.

In an aspect, the predetermined pattern is at least one of a staggered pattern, a valley pattern, and a crenellation pattern.

In an aspect, not all of the ridges have the same height.

In an aspect, the trailing edge of the moisture absorbing layer and the wicking layer trailing edge are aligned.

In an aspect, the moisture control apparatus further comprises a reverse-bevel defined along the leading edge of the moisture absorbing layer, wherein the reverse-bevel and the upper surface of the structure define a gutter configured to retain liquid flowing down the upper surface of the structure.

In an aspect, the moisture control apparatus further comprises a barrier positioned along at least one of the trailing edge and at at least one of the side edges.

In an aspect, the barrier is moisture impermeable.

In an aspect, the barrier includes a first leg connected to a second leg oriented at a non-parallel angle to the first leg, and where the first leg of the barrier extends above the upper surface of the moisture absorbing layer forming a gutter between the two legs of the barrier and the upper surface of the moisture absorbing layer.

In an aspect, the moisture absorbing layer is configured with perforations through the layer.

In an aspect, the perforations are located at the leading edge of the moisture absorbing layer to create serrations.

In an aspect, the serrations are aligned with ridges of the wicking layer to enhance fluid communication.

In an aspect, the moisture control apparatus further comprises at least one of a reverse-beveled leading edge, a barrier at the trailing edge, a barrier at at least one side edge, serrations at the leading edge and perforations.

In an aspect, the structure is a ceiling or a stowage bin of the aircraft.

In an aspect, the moisture absorbing material comprises a moisture absorbing felt.

There is provided, a moisture control system for use within a fuselage of an aircraft, the system comprising: a structure within the fuselage, the structure comprising an upper surface; and, a moisture control apparatus for use with a structure within an aircraft fuselage, the structure including an upper surface, the apparatus comprising, a moisture absorbing layer including a moisture absorbing material, the moisture absorbing layer including a leading edge, a trailing edge, side edges, an upper surface, and, a lower surface; and, a wicking layer disposed in fluid communication with the lower surface of the moisture absorbing layer, the wicking layer including a wicking layer leading edge, a wicking layer trailing edge and a wicking layer upper surface configured for capillary action of moisture from the wicking layer trailing edge towards the wicking layer leading edge, wherein the wicking layer leading edge is offset from the leading edge of the moisture absorbing layer such that an offset portion of the wicking layer is exposed to air to facilitate evaporation of the moisture.

In an aspect, the moisture control system further comprises at least one of a reverse-beveled leading edge, a barrier at the trailing edge, a barrier at at least one side edge, serrations at the leading edge and perforations.

There is provided, a method for making a moisture control apparatus having a moisture absorbing layer including a moisture absorbing material and a wicking layer, the method comprising: adhering the moisture absorbing layer and the wicking layer together to couple the moisture absorbing layer to the wicking layer in fluid communication, wherein the wicking layer includes a plurality of ridges defined in an upper surface of the wicking layer, a trough defined between each adjacent pair of the plurality of ridges, and wherein a leading edge of the wicking layer is offset from a leading edge of the moisture absorbing layer such that an offset portion of the wicking layer is exposed to air to facilitate evaporation of moisture.

Unless otherwise defined, all technical and/or scientific terms used herein have the same meaning as commonly understood by one of ordinary skill in the art to which the disclosed aspects pertain. Although methods and materials similar or equivalent to those described herein can be used in the practice or testing of aspects, exemplary methods and/or materials are described below. In case of conflict, the patent specification, including definitions, will control.

In addition, the components, materials, methods, and examples are illustrative only and are not intended to be necessarily limiting.

Implementation of the method and/or system of aspects of the disclosed aspects can involve performing or completing selected tasks manually, automatically, or a combination thereof. Moreover, according to actual instrumentation and equipment of aspects of the method and/or system of the application, several selected tasks could be implemented by hardware, by software or by firmware or by any combination thereof, using for instance an operating system.

BRIEF DESCRIPTION OF THE DRAWINGS

Some aspects are herein described, by way of example only, with reference to the accompanying drawings and/or images. With specific reference now to the drawings in detail, it is stressed that the particulars shown are by way of example, and not necessarily to scale, and are for purposes of illustrative discussion of the aspects:

FIG. 3 is a side view of a prior art moisture control apparatus;

FIG. 5A is a side, cross-sectional view of a first trailing edge barrier moisture control apparatus;

FIG. 5B is a side, cross-sectional view of a second trailing edge barrier moisture control apparatus;

DESCRIPTION

The present disclosure generally relates to the moisture control field. More particularly, the present disclosure relates to the field of moisture control in a vehicle.

Figure 1:
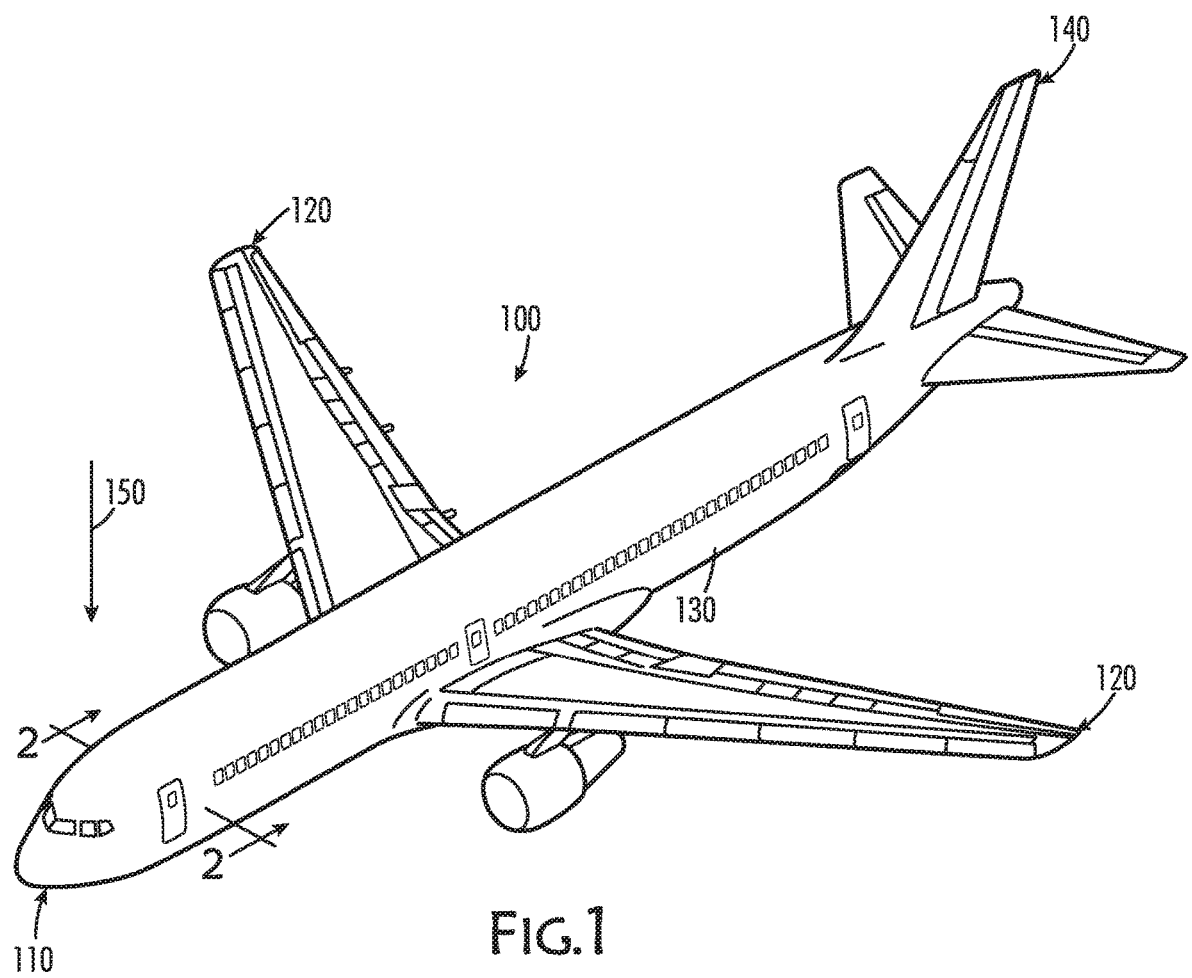
FIG. 1 is a schematic diagram of an aircraft.
Figure 2:
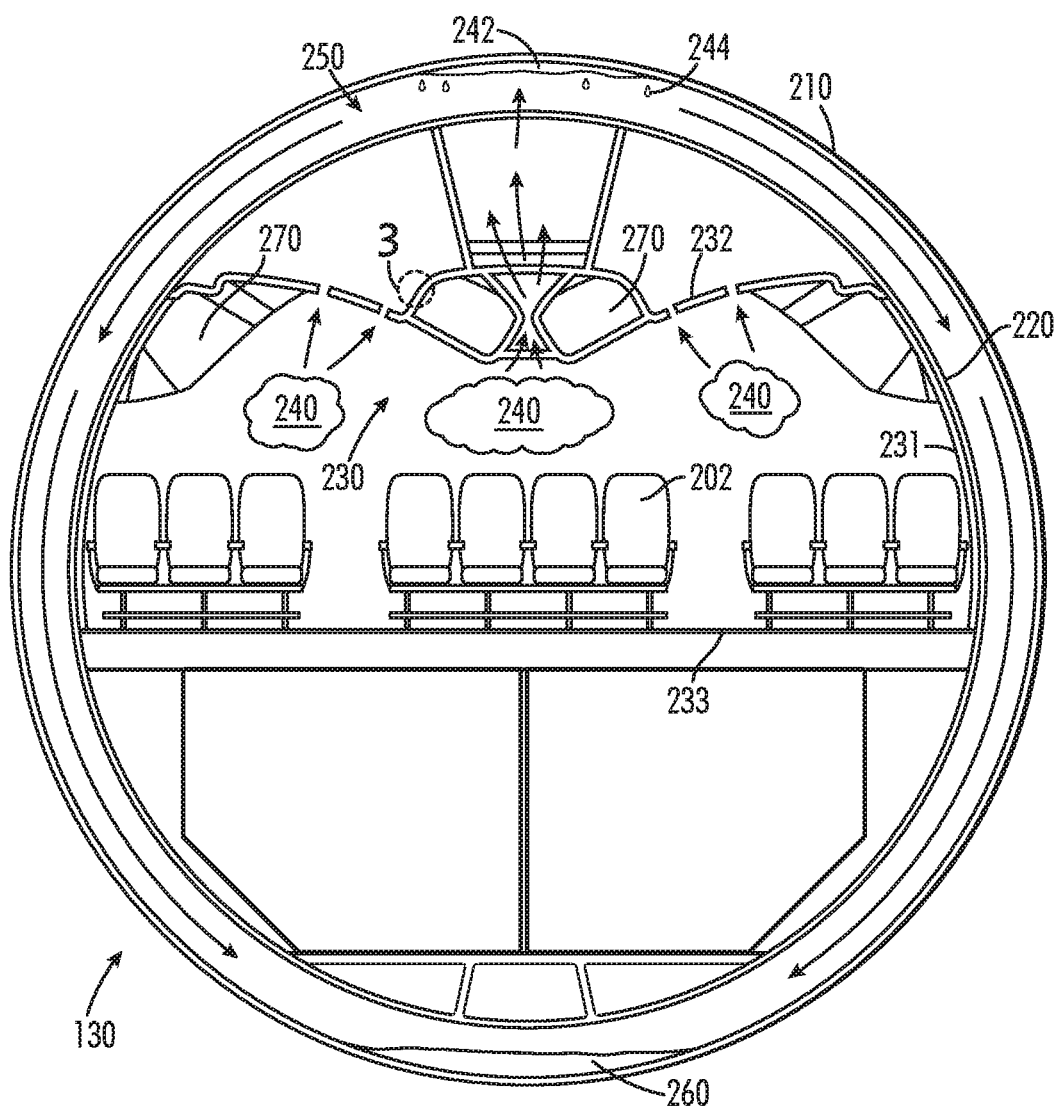
FIG. 2 is an exemplary cross-sectional, schematic view of an aircraft.

FIGS. 1-2 illustrate components of an exemplary aircraft and exemplary moisture flow therein, while FIGS. 4A-5B, 6B-9 and 11-12B show exemplary moisture control apparatuses for preventing or at least minimizing moisture flow into an inner cabin portion of the aircraft, according to some aspects of the disclosure. It should be understood that depending on the severity and/or particular disposition of the moisture flow in an aircraft, one or more of the moisture control apparatus solutions described herein could be used, in some cases in combination and/or synergistically.

FIG. 1 shows an aircraft 100 that includes a nose 110, wings 120, a fuselage 130, and a tail 140. FIG. 1 also illustrates a downward arrow 150 indicating the expected direction in which the force of gravity will pull objects, such as liquid water, onboard an aircraft 100 in a nominal operational profile. As used herein, "down", "downward" and "bottom" generally correspond to the direction of arrow 150, while "up", "upper" and "top" are generally in the opposite direction of the arrow 150.

FIG. 2 is a cross-sectional, schematic view of the aircraft 100 indicated by view arrows 2 in FIG. 1. FIG. 2 illustrates a portion of the aircraft fuselage 130, simplified for easier understanding of this Description. The fuselage 130 includes aesthetic fascia walls 231, a ceiling 232, and a floor 233, which define the passenger cabin 230. Passengers in the aircraft 100 may congregate in seats 202 of the cabin 230 during flight. FIG. 2 illustrates that, inside of the fuselage 130 (e.g. in cabin 230), respiration and other sources of water cause moisture 240 to enter or form in the air in the cabin 230. For example, warm exhaled air includes moisture 240 and rises upward through luggage compartments/stowage bins 270. Some of this warm and moist air rises through the ceiling 232. Furthermore, some warm air continues to rise upward through an insulation layer 220 (or insulation blanket) into a space 250 between the insulation layer 220 and an outer wall 210 of the aircraft, also known as the aircraft skin.

As the skin 210 is cooled by the outside air at high altitude during flight, the temperature of the skin 210 eventually decreases to a temperature below the freezing temperature of water. This cooling causes moisture 240 (e.g., water) to condense out of the air in the space 250 and freeze onto the inner surface of the skin z210 as ice 242. As the aircraft changes to a lower altitude and/or commences descent for landing and the temperature increases, the ice 242 can begin to melt causing moisture droplets 244 to travel through the space 250 towards the bottom 260 of the fuselage 130, drawn by gravity 150. Some moisture droplets 244 enter gaps in the insulation layer 220, drip on top of structures in the fuselage, such as the ceiling 232 and the stowage bins 270, and subsequently into the cabin 230. The size of the space 250 has been exaggerated somewhat in FIG. 2 in order to more clearly show the details of the structure. For simplicity, common aircraft load bearing components such as stringers and/or frame members are not shown.

As indicated previously, FIG. 3 is a side view of a prior art moisture control apparatus 300. Conventionally, the moisture control apparatus 300 comprises the moisture absorbing layer 306, the lower surface of which is applied to the upper surfaces of aircraft structures, for example those forming the cabin 230, such as on the upper surfaces of the ceiling 232 and stowage bins 270. Typically the moisture absorbing layer 306 is attached to the structures using an adhesive (for simplicity, any adhesive layers are not shown). In practice, when moisture droplets 244 drip from the upper portion of the fuselage 130 onto the upper surfaces of the cabin 230, the moisture control apparatus 300 will usually absorb the moisture droplets 244. However, if too much moisture falls in a single area, the moisture control apparatus 300 can become saturated locally and further moisture droplets 244 added to the moisture absorbing layer 306 will leak 302 out a trailing edge of the felt. This can even occur when the moisture absorbing layer 306 on either side on the problem area of the moisture control apparatus 300 is dry. Local saturation of the moisture control apparatus 300 results in moisture dripping into the interior and onto passengers through gaps in the cabin 230. Additionally, on steeply angled surfaces, moisture droplets 244 can be moving rapidly when the droplets 244 contact the moisture absorbing layer 306. This can cause the moisture droplets 244 to jump 304 over the moisture absorbing layer 306 before the droplets 244 have a chance to be absorbed.

Figure 4A:
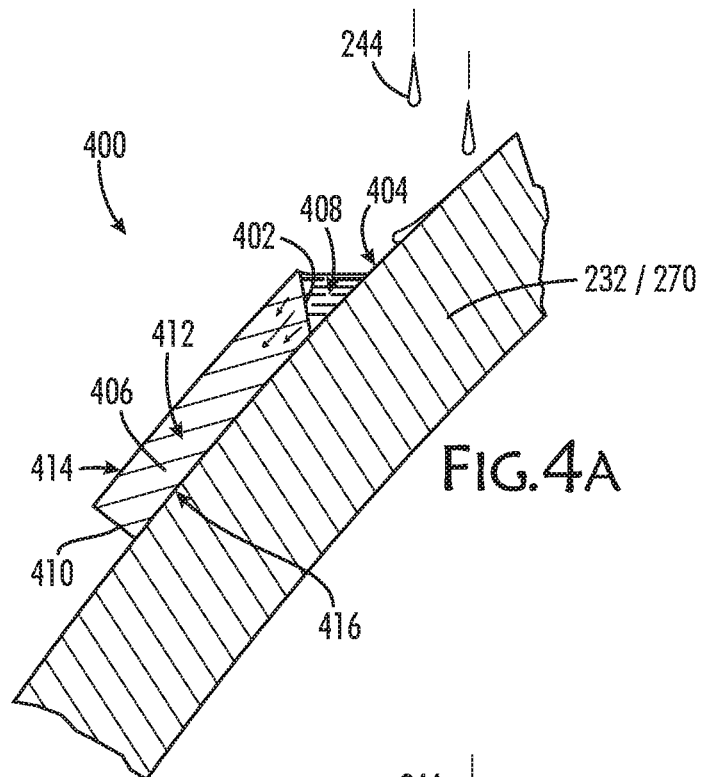
FIGS. 4A-4B are side, cross-sectional views of a moisture control apparatus configured with a reverse-bevel.
Figure 4B:
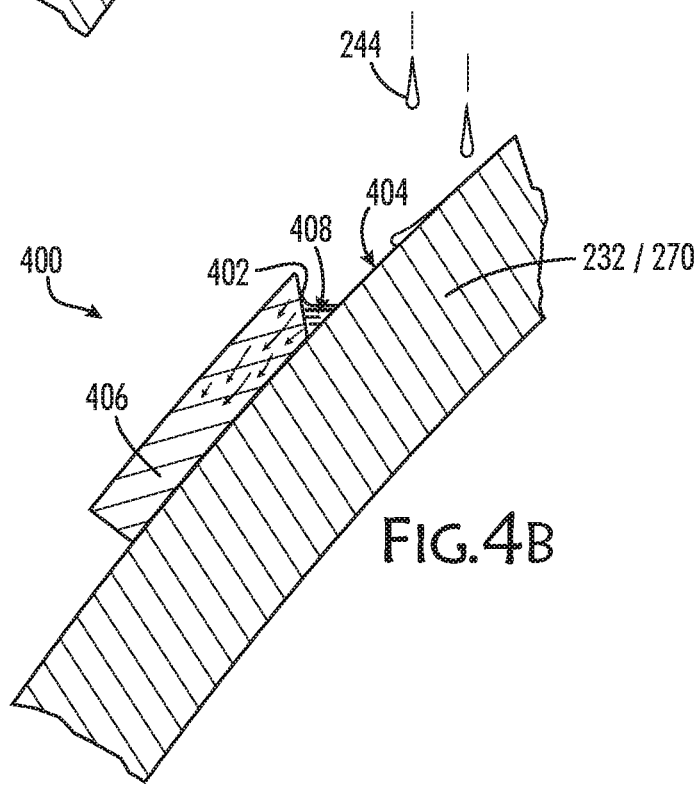

FIGS. 4A-4B are side, cross-sectional views of a moisture control apparatus 400, in an accordance with an aspect of the disclosure. The moisture control apparatus 400 includes a moisture absorbing layer 406 and a leading edge 402 configured with a reverse-bevel ("reverse-beveled" with respect to an upper surface 404 of an aircraft structure like the ceiling 232 or a stowage bin 270). In an aspect, the moisture absorbing layer 406 includes the leading edge 402, a trailing edge 410, at least one side edge 412, an upper surface 414, and, a lower surface 416. It should be understood each of the moisture control apparatuses 400, 500, 550, 700, 750, 800, 900, described herein, generally includes these features, but possibly with some variation. In some aspects, the leading edge 402 is configured with up to an 89° reverse-bevel. In some aspects, the leading edge 402 is configured with up to a 45° reverse-bevel. In some aspects, the leading edge 402 is configured with an approximately 45° reverse-bevel. In some aspects, the leading edge 402 is configured with an approximately 30° reverse-bevel.

Figure 6A:
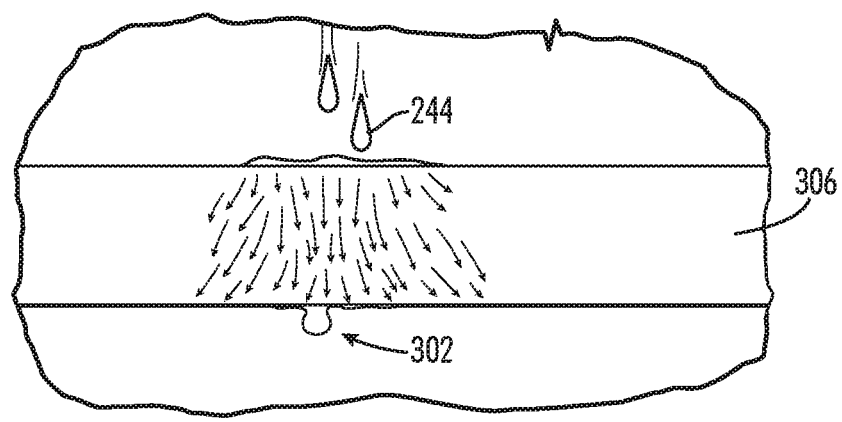
FIG. 6A is a top view of a prior art moisture control apparatus.
Figure 6B:
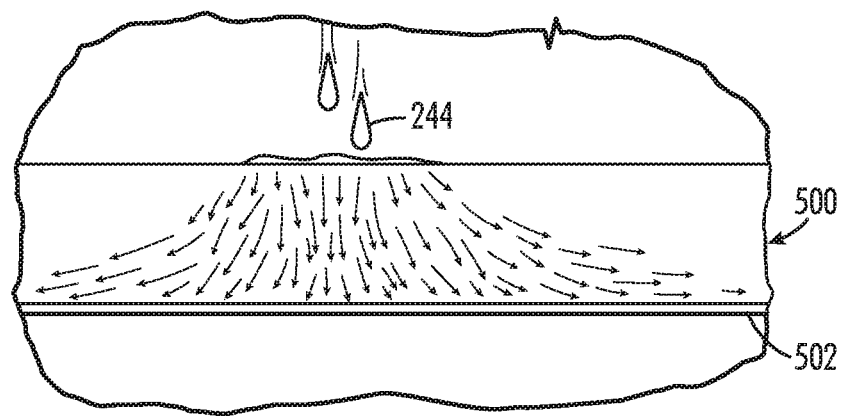
FIG. 6B is a top view of a trailing edge barrier moisture control apparatus.

The moisture absorbing layer 406 is formed from a moisture absorbing material, such as moisture absorbing felt. The leading edge 402 configured with the reverse-bevel is configured to work with the upper surface 404 to define a gutter 408, or at least a larger leading edge cavity in comparison to moisture control apparatus 300, to retain moisture long enough for the moisture to start wicking into leading edge 402 of the moisture absorbing layer 406 without overflow and/or jumping over the moisture absorbing layer 406. Retaining moisture in the gutter 408 can enable subsequent droplets 244 to also be absorbed into the moisture absorbing layer 406, such as shown in FIG. 4B, instead of overflowing or jumping the moisture absorbing layer 406. An additional benefit is that the gutter 408 allows side-to-side wicking/movement of the accumulated moisture, allowing the moisture absorbing layer 406 to be more uniformly saturated across the leading edge 402 rather than having discrete flow paths through the moisture absorbing layer 406 (such as shown in FIG. 6A).

Figure 7A:
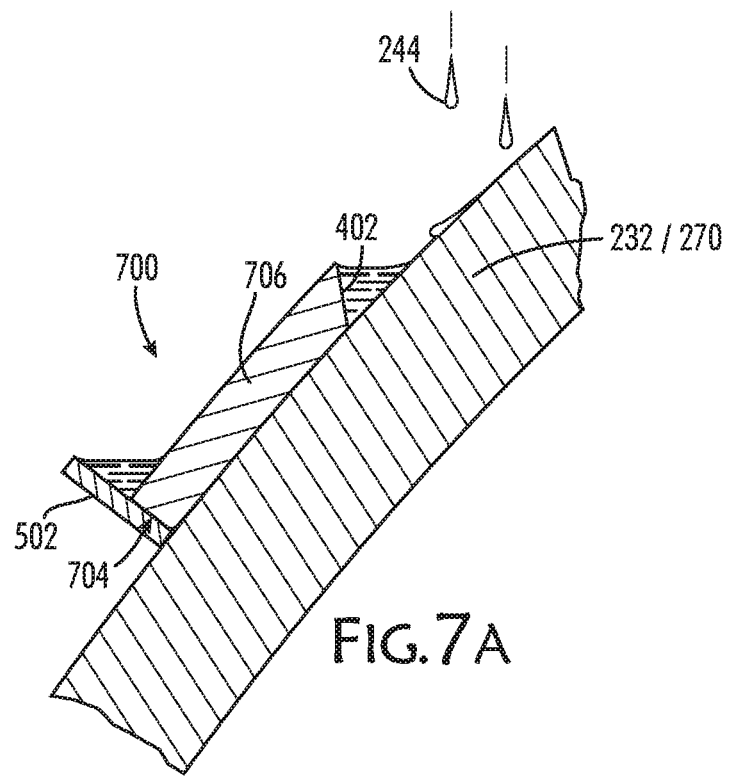
FIGS. 7A-7B are a side, cross-sectional views of a moisture control apparatus configured with a reverse-bevel and a trailing edge barrier.
Figure 7B:
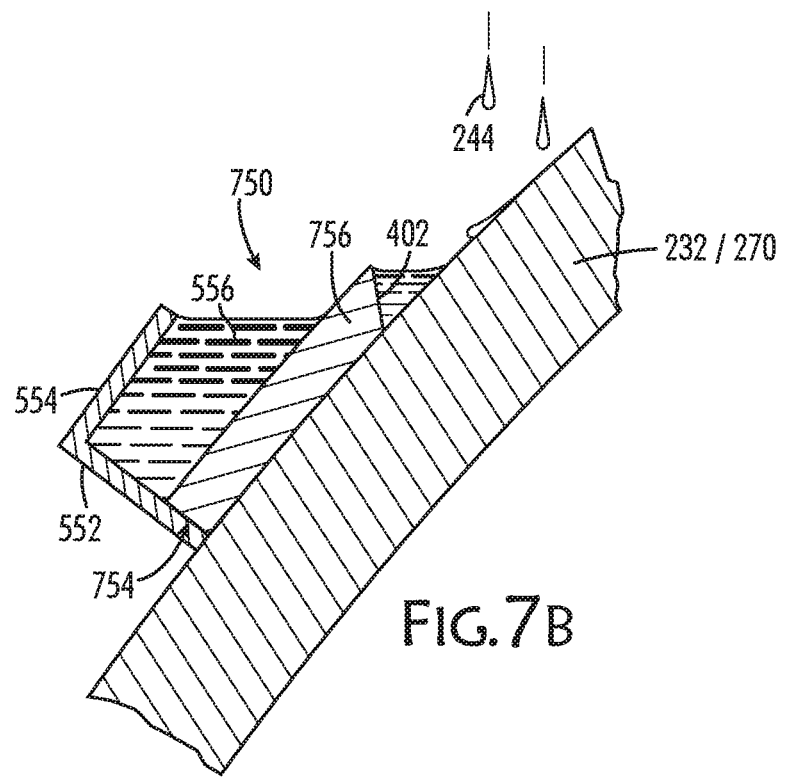
Figure 8A:
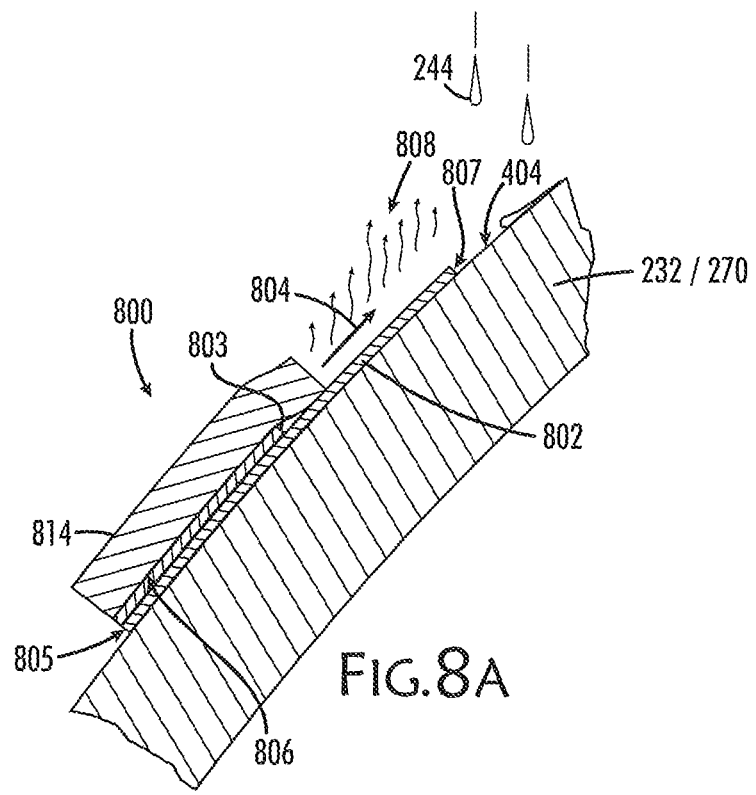
FIG. 8A is a side, cross-sectional view of a wicking tape moisture control apparatus.
Figure 8B:
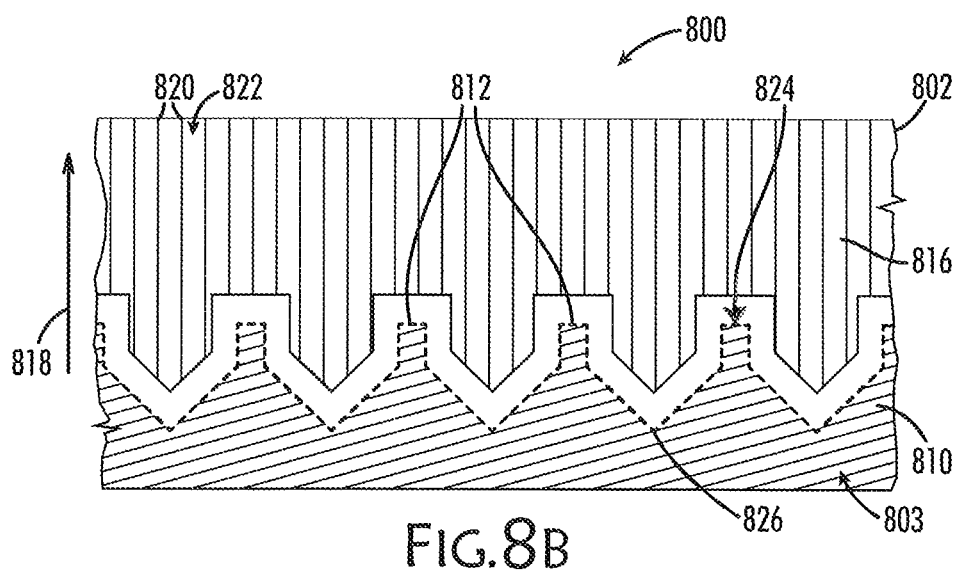
FIG. 8B is a top view of a wicking tape moisture control apparatus.
Figure 9:
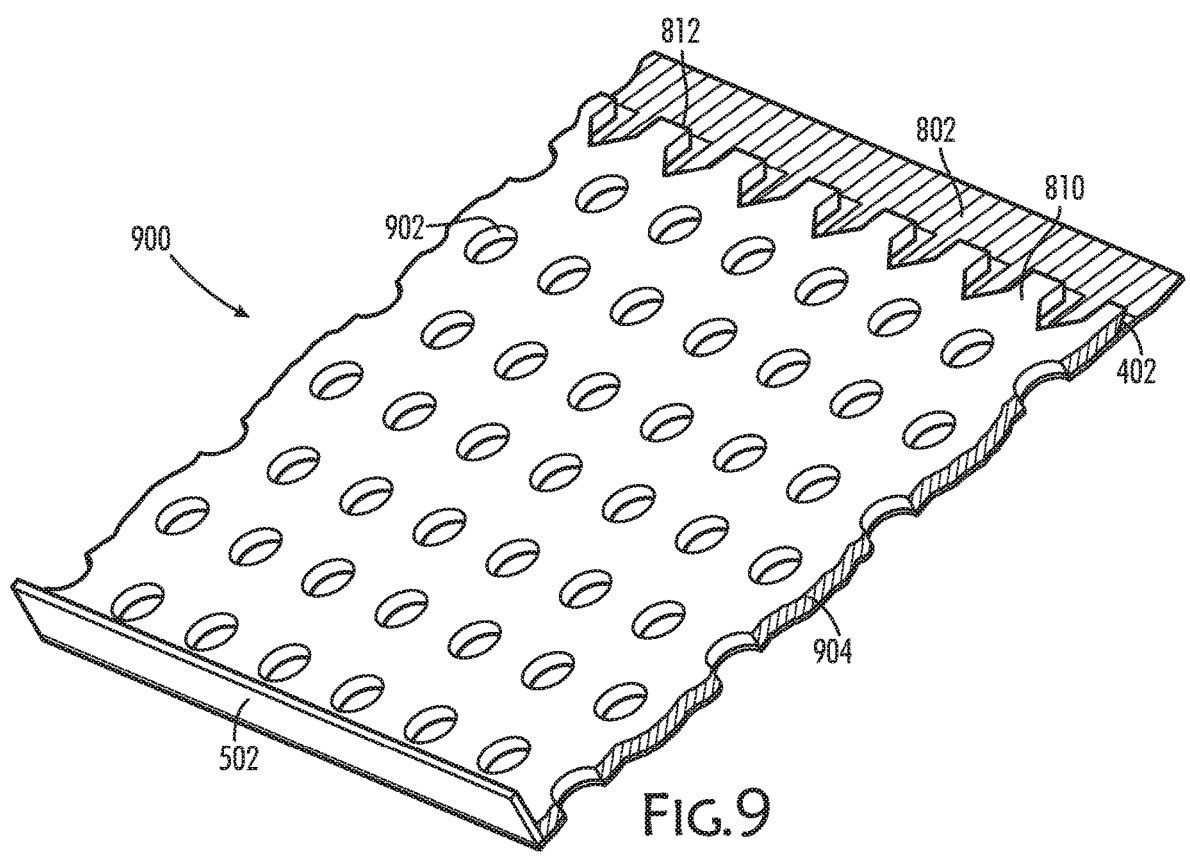
FIG. 9 is a perspective view of a moisture control apparatus configured with a reverse-bevel, perforations, wicking tape, and a trailing edge barrier.

In an aspect, if it is found that, before beads begin to wick, the moisture in the gutter 408 sloshes side-to-side (e.g., during pitching of the aircraft 100), the leading edge 402 configured with a reverse-bevel can be used in combination with serrations 812 defined in the leading edge 402, such as shown and described with respect to FIG. 8B and FIG. 9, to prevent sloshing. In some aspects, the leading edge 402 configured with a reverse-bevel is used with a wicking aspect, such as shown and described with respect to FIGS. 8A, 8B and 9. Additionally, alternatively and/or optionally, the leading edge 402 configured with a reverse-bevel is used with a barrier, such as described with respect to FIGS. 7A, 7B and 9.

In addition to the performance benefits described above, an additional advantage of some or all of the moisture control solutions described herein will be reduced weight (as compared to adding as many layers of felt as possible to improve capture, retention and/or evaporation of moisture).

FIG. 5A is a side, cross-sectional view of a first trailing edge barrier moisture control apparatus 500, in accordance with an aspect of the disclosure. A barrier 502 is affixed to a trailing edge 504 of the moisture absorbing layer 506 of the moisture control apparatus 500. The barrier 502, which is optionally waterproof (moisture impermeable) and/or moisture resistant, can prevent or delay moisture in moisture absorbing layer 506 from leaking out the trailing edge 504 if the moisture absorbing layer 506 becomes overly saturated, giving the moisture which is absorbed by the moisture absorbing layer 506 additional time for evaporation and/or wicking while also keeping the cabin 230 dry. In an aspect, the barrier 502 has a height 508, the height 508 of the barrier 502 being equal to or larger than a thickness of the moisture absorbing layer 506.

As an additional benefit, the capacity of the moisture absorbing layer 506 can be increased by adding the barrier 502 to the trailing edge 504 of the moisture absorbing layer 506. In an aspect, the barrier 502 forces wicking side-to-side within the moisture absorbing layer 506, shown in FIG. 6B, rather than the moisture flow being in a discrete stream through the moisture absorbing layer 506, such as shown in FIG. 6A. When sufficient moisture hits a local area, causing the moisture absorbing layer 506 in the local area to become saturated, adding more moisture will not result in moisture escaping from the trailing edge 504 because the barrier 502 encourages the moisture to flow or wick to dry areas of the moisture absorbing layer 506 on either side of the local area, increasing the practical capacity of the moisture absorbing layer 506.

In an aspect, the increases in the moisture absorbing layer's 506 capacity locally using the barrier 502 can eliminate or reduce the need to add more moisture absorbing material, reducing the cost and weight of the airplane 100.

FIG. 5B is a side, cross-sectional view of a second trailing edge barrier moisture control apparatus 550, according to an aspect of the disclosure. A barrier 552 is affixed to the trailing edge 560 of a moisture absorbing layer 558 to slow and/or block moisture in the moisture absorbing layer 558 from leaking out of the trailing edge 560. The barrier 552 can be L-shaped such that the barrier includes a first leg 554 connected to a second leg 562 wherein the second leg 562 is oriented at a non-parallel angle to the first leg 554. As illustrated, the second leg 562 is at a right angle to the first leg 554, however, the second leg 562 can be at any suitable angle with respect to the first leg 554 that allows the barrier 552 to function as described herein. In an aspect, the barrier 552 is configured such that one of the first leg 554 of the L-shape functions as a top, extending above and substantially parallel to the upper surface 564 of the moisture absorbing layer 558, thereby providing an additional containment gutter 566 for moisture 556 on the upper surface 564 of the moisture absorbing layer 558.

In some aspects, a structure similar to the barrier 502, 552 is also included on at least one side edge 510, 568 of the moisture absorbing layer 506, 558 as a side edge barrier. As used herein, reference to a "barrier" can indicate a "trailing edge barrier" and/or a "side edge barrier". In some aspects of the disclosure, the barriers 502, 552 are used in combination with the leading edge 402 configured with a reverse-bevel shown and described with respect to FIGS. 4A-4B. Additionally or alternatively, the barrier 502, 552 can be combined with a wicking layer 802 and/or serrations 812 in the leading edge, the wicking layer 802 and/or the serrations 812 described with respect to FIGS. 8A-8B and FIG. 9. One example of a combination of the barrier 502, 552 and the serrations 812 is shown FIG. 9. In some aspects, the barriers 502, 552 are constructed of a closed-cell foam material, for example polyvinylidene difluoride (PVDF).

One example of the barrier 502, 552 in combination with the leading edge 402 configured with a reverse-bevel is shown in FIGS. 7A-7B, which are side, cross-sectional views of moisture control apparatuses 700, 750 (FIGS. 7A and 7B, respectively). The moisture control apparatus 700 of FIG. 7A includes barrier 502 attached to a trailing edge 704 of a moisture absorbing layer 706 in combination with the leading edge 402 configured with a reverse-bevel. Similarly, the moisture control apparatus 750 of FIG. 7B includes barrier 552 attached to a trailing edge 754 of a moisture absorbing layer 756 in combination with the leading edge 402 configured with a reverse-bevel. In an aspect, the combination of the leading edge 402 configured with a reverse-bevel with the barrier 502, 552 can enhance the capacity of a moisture control apparatus 700, 750 by heightening absorption and evaporation of the moisture condensate, and overall utilization of the moisture control apparatus 700, 750.

Figure 11:
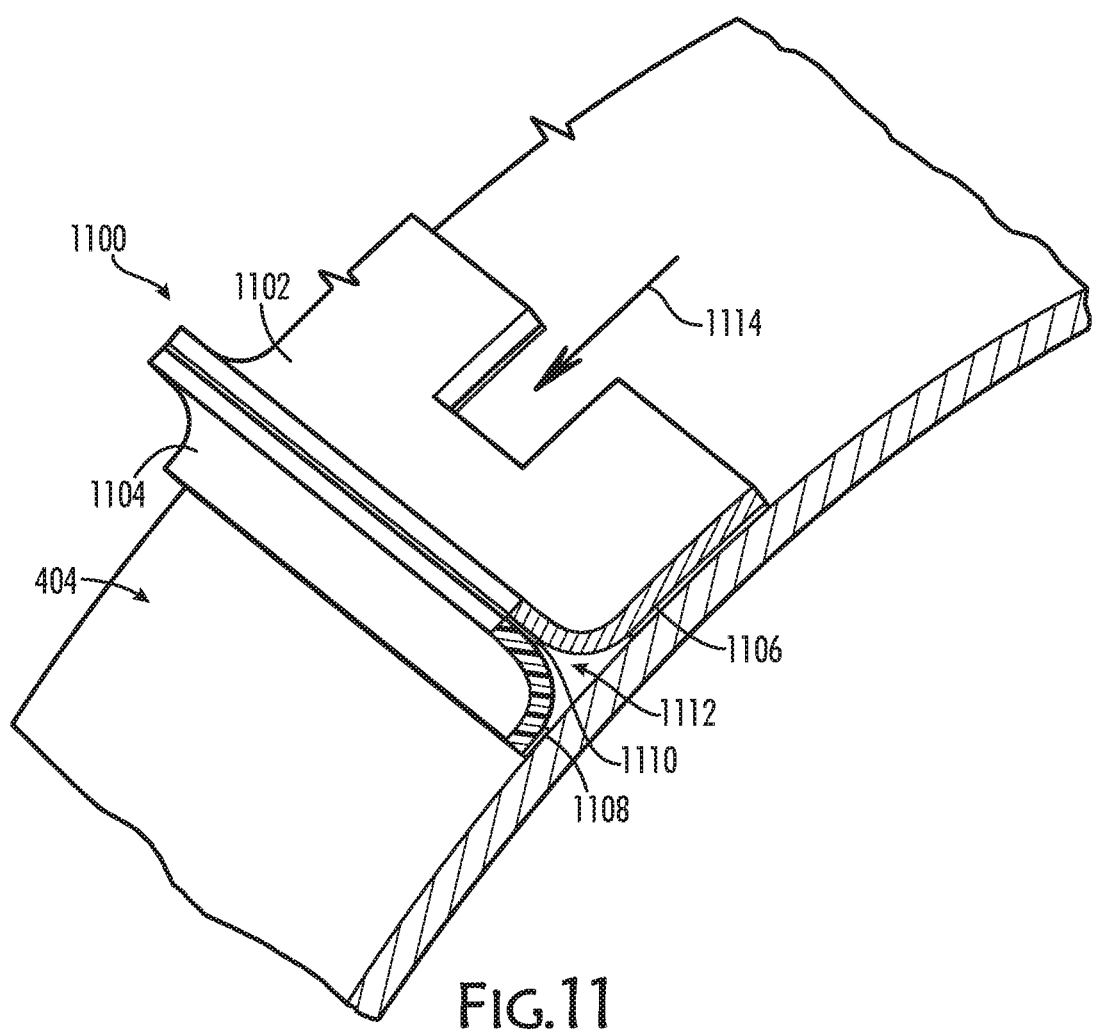
FIG. 11 is a perspective view of a rolled moisture control apparatus configured with a rolled trailing edge barrier.
Figure 12A:
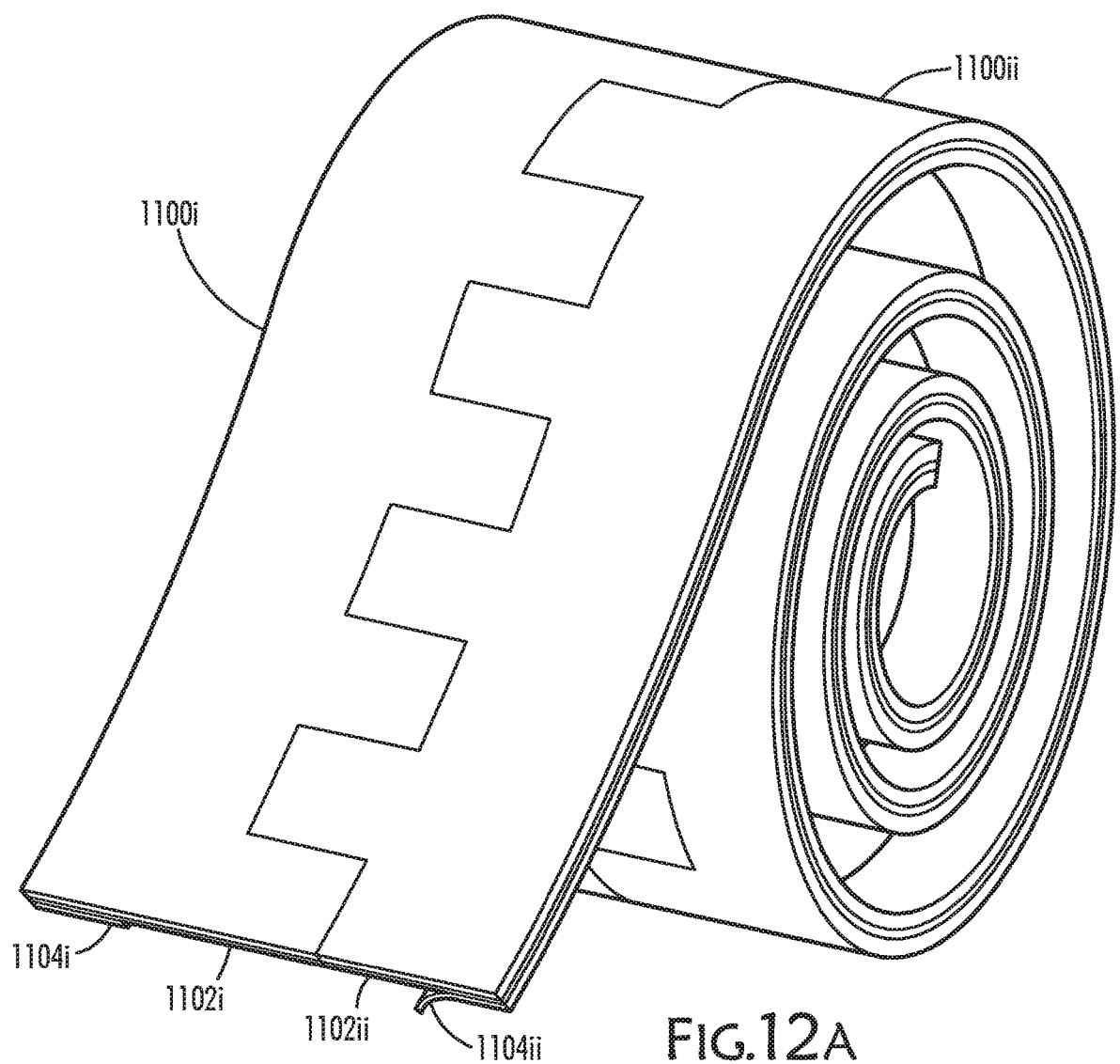
FIG. 12A is a perspective view of a rolled moisture control apparatus configured with a rolled trailing edge barrier on a roll; and, FIG. 12B is a perspective view of a flattened, rolled moisture control apparatus configured with a rolled trailing edge barrier.
Figure 12B:
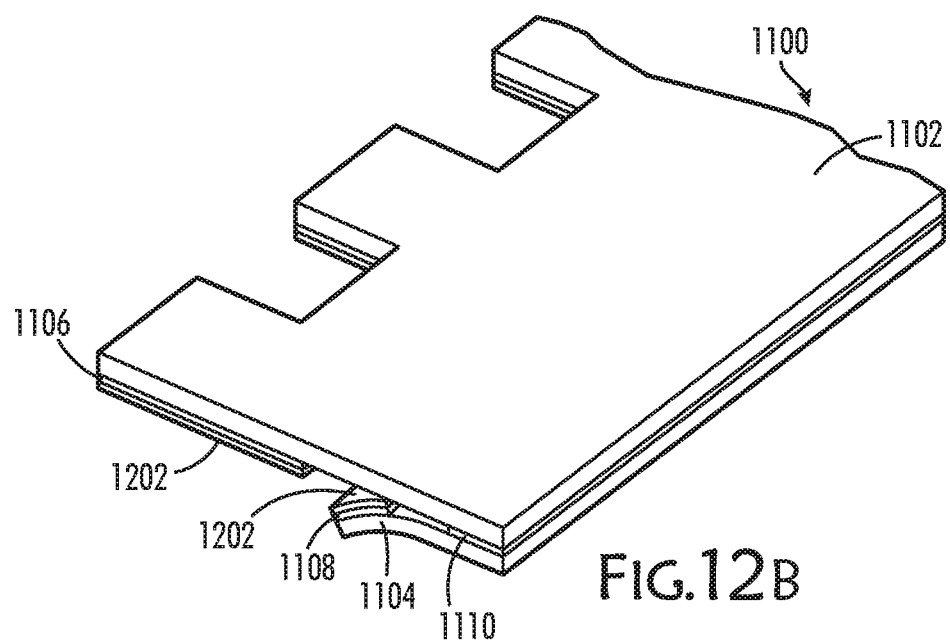

FIG. 11 is a perspective view of a rolled moisture control apparatus 1100 configured with a rolled moisture absorbing layer 1102 and a corresponding rolled trailing edge barrier 1104. In an aspect, the rolled moisture control apparatus 1100 is placed on an upper surface 404, on which moisture droplets 244 travel in direction 1114 (from the upper part of the fuselage 130 towards the lower part). As shown in FIGS. 12A-12B and according to some aspects, the rolled moisture absorbing layer 1102 and the rolled trailing edge barrier 1104 are bonded together along the trailing edge of the rolled moisture absorbing layer 1102 (in this aspect, to a bottom surface of the trailing edge) during manufacture by an adhesive layer 1110, but only along a partial portion of the rolled trailing edge barrier 1104 which is to function as the barrier to the rolled moisture absorbing layer 1102, since another portion of the rolled trailing edge barrier 1104 is to be adhered to the upper surface 404, optionally using a trailing edge adhesive layer 1108.

In some aspects, a gap 1112 is created between the rolled moisture absorbing layer 1102 and the rolled trailing edge barrier 1104 near the upper surface 404 when the rolled moisture control apparatus 1100 is installed. This gap 1112 can optionally be used as a reservoir for leaking moisture and/or as a gutter for transporting the moisture elsewhere. In some aspects, at least one open end of the gap 1112 is at least partially capped, for example by a side edge barrier. Optionally, there is no gap 1112.

The rolled moisture control layer 1102 is attached to the upper surface 404 using an adhesive layer 1106, in some aspects. Optionally, the rolled moisture control apparatus 1100 is configured with a crenelated/serrated leading edge 1116 with an optionally matching predetermined pattern 826 (described in more detail below with respect to FIG. 8B) for the adhesive layer 1106. Optionally, the rolled moisture control apparatus 1100 is used with any of the other moisture control solutions described herein, such as a reverse-beveled leading edge and/or a wicking layer. Optionally, the rolled trailing edge barrier 1104 extends higher than the rolled moisture absorbing layer 1102 when the rolled moisture control apparatus 1100 is installed.

FIG. 12A is a perspective view showing rolled moisture control apparatuses 1100i, 1100ii configured with a rolled trailing edge barrier on a roll, for example for storage and/or transport. In an aspect, a rolled moisture control apparatus is manufactured in a continuous roll-to-roll process wherein a rolled moisture control layer is adhered to a rolled trailing edge barrier to create the moisture control apparatus. In an aspect, the moisture absorbing layer is cut to separate a first moisture control apparatus 1100i from a second moisture control apparatus 1100ii, each configured with their respective rolled moisture absorbing layers 1102i, 1102ii and rolled trailing edge barriers 1104i, 1104ii. Optionally, the cut imbues a serrated leading edge to the moisture control apparatuses 1100i, 1100ii.

FIG. 12B is a perspective view of a flattened, rolled moisture control apparatus 1100 configured with a rolled trailing edge barrier 1104. From this view, an exemplary configuration of the a rolled moisture absorbing layer 1102, the rolled trailing edge barrier 1104 and the adhesive layers 1106, 1108, 1110 can be seen. In an aspect, a removable adhesive protection layer 1202 is provided to adhesive layers 1106, 1108 to prevent them from sticking to anything other than the upper surface 404 prior to installation. Optionally, the removable adhesive protection layer 1202 is a peel-off layer. For installation, the adhesive protection layers 1202 would be removed, the moisture absorption layer 1102 would be folded upwards and the rolled trailing edge barrier 1104 would be folded upwards so that the adhesive layer 1108 of the rolled trailing edge barrier faces down towards the upper surface 404. The moisture control apparatus 1100 would then be placed at the desired location on the upper surface 404, adhering the moisture control apparatus 1100 to the upper surface 404 using the adhesive layers 1106, 1008 and with the leading edge facing the direction of oncoming moisture droplets 244.

FIG. 8A is a side, cross-sectional view of a wicking moisture control apparatus 800, in accordance with an embodiment of the disclosure. A wicking layer 802 is disposed between a moisture absorbing layer 814 and an upper surface 404 of a structure 232/270. The wicking layer 802 receives moisture absorbed by the moisture absorbing layer 814 and wicks the moisture in a direction 804 from a wicking layer trailing edge 805 to a wicking layer leading 807 edge, through capillary action, to where the moisture is not covered by the moisture absorbing layer 814, thereby enhancing evaporation of the moisture. In an aspect, moisture that has been absorbed into the moisture absorbing layer 814 is pulled to the lower surface 806 of the moisture absorbing layer 814 by gravity and/or airplane vibration. By drawing the moisture out of the moisture absorbing layer 814, the evaporation process can be accelerated, effectively enabling evaporation from all surfaces and/or edges, lower, upper and/or sides of the moisture control apparatus 800. In addition, the removal of moisture from the moisture absorbing layer 814 enhances the overall absorption capacity because some of the moisture is removed regularly by the wicking layer 802. It should be noted that in conventional moisture control scenarios, the gravitational pull which deposits moisture against the upper surface 404 of the structure 232/270 makes evaporation of the moisture that has accumulated in the moisture absorbing layer 814 more difficult to evaporate. However, by using the wicking layer 802 positioned below the moisture absorption layer 814, the gravitational pull which draws the moisture towards the upper surface 404 of a structure 232/270 is a benefit, causing more moisture to come into contact with the wicking layer 802, and therefore, causing more moisture to wick out of the moisture absorbing layer 814 for evaporation 808.

In some aspects, the wicking layer 802 includes a wicking tape 816, shown and described in more detail with respect to FIG. 8B, with alternating ridges 820 and troughs 822 defining a wicking tape surface. In a particular aspect, the wicking layer 802 includes and/or is formed from a "Condensation Management Film" manufactured by 3M as the wicking tape 816. Preferably, the wicking tape 816 is oriented so a long axis 818 of the ridges 820 and troughs 822 is in the direction 804 of wicking, corresponding to the minor axis of the wicking tape 816, and is substantially transverse to the major axis of the wicking tape 816, as arranged in FIG. 8B. In some aspects of the disclosure, not all of the ridges 820 have the same height or width and/or not all of the troughs 822 have the same depth or width.

In some aspects, an adhesive layer 803 between the moisture absorbing layer 814 and the wicking layer 802 adheres the moisture absorbing layer 814 and the wicking layer 802 together, where the adhesive layer 803 is configured to enable fluid communication between the moisture absorbing layer 814 and the wicking layer 802. In some aspects of the disclosure, the adhesive used in the adhesive layer 803 is a pressure sensitive adhesive that is liquid impermeable. In some aspects, the adhesive layer 803 has a predetermined pattern 826 (examples shown in FIG. 8B and FIG. 11) which places certain areas of the lower surface 806 of the moisture absorbing layer 814 in fluid communication for capillary action with the wicking layer 802. As examples, the predetermined pattern 826 is at least one of a staggered pattern, a valley pattern and a crenellation pattern.

FIG. 8B is a top view of a wicking moisture control apparatus 800 with a serrated moisture absorbing layer 810, in accordance with an aspect of the disclosure. In an aspect, the serrations 812 at the leading edge 824 of the serrated moisture absorbing layer 810 are used to prevent sloshing of moisture which accumulates at the leading edge 824. Additionally or alternatively, the moisture absorbing layer 810 is serrated to increase a contact area between the wicking layer 802 and the moisture absorbing layer 810, drawing out more moisture from the moisture absorbing layer 810 than without the serrations 812, and to increase exposure of the moisture in the wicking layer 802 to the surrounding environment. In some aspects, the serrations 812 in the leading edge 824 are aligned with the ridges 820 of the wicking tape 816 to provide additional points of fluid communication between the moisture absorbing layer 810 and the wicking tape 816.

In some aspects, the leading edge 824 is configured with a reverse-bevel, such as described and shown with respect to leading edge 402 of FIGS. 4A, 4B, 7A, and 7B. In some aspects, a barrier 502, 552 is used with a perforated moisture absorbing layer 904. These options are shown being used in combination in FIG. 9.

As described with respect to FIG. 8A, an adhesive layer 803 is used to adhere the wicking layer 802 and the moisture absorbing layer 810, 814 together. In an aspect, the adhesive layer 803 is configured with a pattern 826, for example such as shown in FIG. 8B, that is adapted to place at least some of the moisture absorbing layer 810, 814 in fluid communication with the underlying wicking layer 802.

FIG. 9 is a perspective view of a moisture control apparatus 900 with the moisture absorbing layer 904 including a leading edge 402 configured with a reverse-bevel, a barrier 502 (although barrier 552 could also be used), a wicking layer 802, and perforations 902, in accordance with an aspect of the disclosure. In some aspects, the moisture absorbing layer 904 configured with perforations 902 is formed of a water absorbent material, such as BMS8-242 Aramid felt. The perforations 902 are holes in and/or cut-out of the moisture absorbing layer 904. In some aspects, these perforations 902 enhance the utility of the moisture absorbing layer 904 because of an optionally staggered configuration that ensures that moisture traveling within the moisture absorbing layer 904 from the leading edge to the trailing edge will travel an indirect, winding and somewhat random path through the moisture absorbing layer 904 towards the trailing edge. Since the moisture will travel a longer path through the moisture absorbing layer 904 than in a layer without perforations 902, there is a higher likelihood that the moisture will not travel into an area oversaturated by prior moisture, such as shown occurring in FIG. 6A, and/or will have a longer time frame for absorption and/or evaporation. In some aspects, the moisture absorbing layer 904 is thicker than conventional non-perforated moisture absorbing layers to account for the loss of absorbent material due to the perforations 902, for example thicker than ¼ in.

As described above, the perforations 902 are arranged into rows and the perforations 902 in neighboring rows are staggered with respect to each other. In some aspects, the perforations 902 comprise varying shapes. For example, perforations 902 may be chosen so as to increase moisture retention, or to increase the amount of distribution of moisture as the moisture enters and/or travels within the moisture absorbing layer 904. In some aspects, the perforations 902 account for 40%-60% of the volume of the moisture absorbing layer 904.

It should be understood that a combination of some or all of the moisture control solutions shown in FIG. 9 are used to deliver a workable arrangement for dealing with undesirable moisture within an aircraft 100. For example, the perforations 902 enhance evaporation and/or reduce sloshing and/or enhance absorption by increasing surface area, while the barrier 502, 552 reduces trailing edge dripping of moisture and/or enhances total usage of the moisture absorbing layer 904, while the leading edge 402 configured with the reverse-bevel enhances moisture retention and/or absorption and/or enhances total usage of the moisture absorbing layer 904, while the wicking layer 802 enhances evaporation and/or reduces saturation of the moisture absorbing layer 904 (utilizing gravity, which was previously a disadvantage, as an advantage), as examples.

Figure 10:
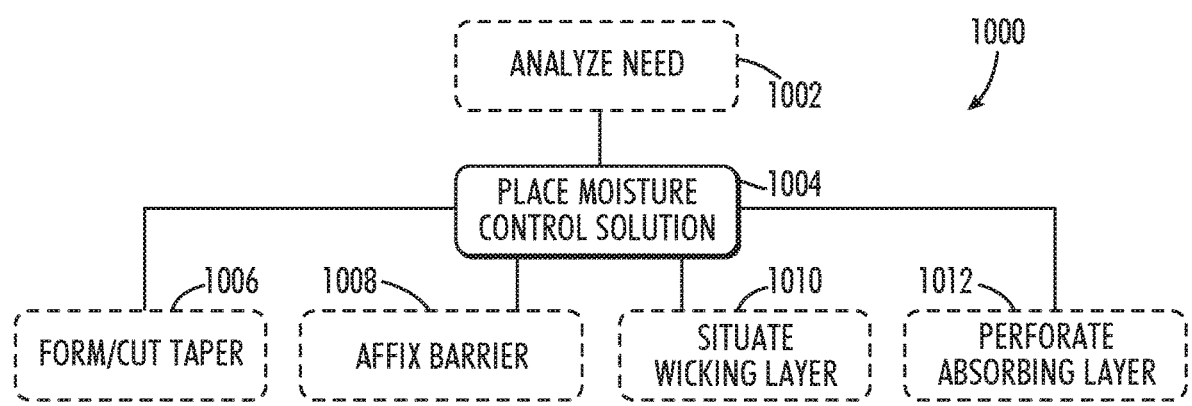
FIG. 10 is a method of using a moisture control apparatus.

FIG. 10 is a method (1000) of using a moisture control apparatus for preventing or at least minimizing moisture flow into an inner cabin 230 portion of the aircraft 100. In an aspect, analyzing (1002) a moisture control need for the aircraft 100 and/or a specific moisture control site within the aircraft 100 is optionally performed. Depending on a degree and/or technique and/or focus of moisture control that is desirable, one or more of the moisture control solutions described herein are employed. In some aspects of the disclosure, placing (1004) a moisture absorbing layer 406, 706, 756, 810, 904, 1102 with one or more of the moisture control solutions, for example the leading edge 402 configured with a reverse-bevel, and/or a barrier 502, 552, 1104 and/or the wicking layer 802, and/or perforations 902, and/or serrations 812 is performed at a moisture control site, likely an upper surface 404 within the aircraft interior, such as on top of the ceiling 232 or a stowage bin 270. The moisture control solution is therefore, one or a combination of the moisture control apparatuses 400, 500, 550, 700, 750, 800, 900, 1100 described herein.

In some aspects of the disclosure, forming/cutting (1006) the reverse-bevel of the leading edge 402 into a moisture absorbing layer 406, 706, 756, 810, 904, 1102 to create moisture control apparatuses 400, 700, 750, 800, 900, 1100 occurs prior to or after placing (1004). In an aspect, placing (1004) the moisture absorbing layer 406, 706, 756, 810, 904, 1102 with a leading edge 402 on an upper surface 404 creates, for example, a gutter 408 for trapping and/or distributing, across the leading edge 402, moisture dripping down the upper surface 404 from the crown of the aircraft 100, reduces the weight of the moisture absorbing layer 406, 706, 756, 810, 904, 1102 enhances the overall usage of the moisture absorbing layer 406, 706, 756, 810, 904, 1102 increases the time and/or available surface area for evaporation of the moisture, and/or reduces the likelihood of moisture dripping into the cabin 230 of the aircraft 100.

In some aspects of the disclosure, affixing (1008) a barrier 502, 552, 1104 to the trailing edge 504, 560, 704, 754 and/or at least one side of the moisture absorbing layer 506, 558, 706, 756, 810, 904, 1102 is performed to create moisture control apparatuses 500, 550, 700, 750, 900, 1100. For example, the barrier 502, 552, 1104 could be affixed on the moisture absorbing layer 506, 558, 706, 756, 810, 904, 1102 before placing (1004), but side edge barriers could be affixed during or after placing (1004). Alternately, the barrier 502, 552, 1104 is placed on the trailing edge and/or at least one side concurrently or nearly concurrently, before, during or after the moisture absorbing layer is placed (1004). In an aspect, benefits of using a barrier 502, 552, 1104 include slowing or preventing moisture from leaking 304 out of the moisture absorbing layer 506, 558, 706, 756, 810, 904, 1102 enhancing the overall usage of the moisture absorbing layer 506, 558, 706, 756, 810, 904, 1102 increasing the time and/or available surface area for evaporation of the moisture, and/or reducing the likelihood of moisture dripping into the cabin 230 of the aircraft 100.

In some aspects of the disclosure, situating (1010) the wicking layer 802 between the moisture absorbing layer 810, 814, 904, 1102 and the upper surface 404 is performed, prior to placing (1004) the moisture absorbing layer 810, 814, 904, 1102 to create moisture control apparatuses 800, 900, 1100. In some aspects, the wicking layer 802 is either laid down separately or pre-attached to the bottom of the moisture absorbing layer 810, 814, 904, 1102 such that wicking, capillary channels of the wicking layer 802 are placed in operative communication with the bottom 806 of the moisture absorbing layer 810, 814, 904, 1102 for wicking moisture away from the bottom 806. As examples of the benefits of using the wicking layer 802, situating (1010) the wicking layer 802 under the moisture absorbing layer 810, 814, 904, 1102 (and/or the gap 1112) draws out moisture from the moisture absorbing layer 810, 814, 904, 1102 (and/or the gap 1112), increasing its effective capacity, and/or increases the time and/or available surface area for evaporation of moisture, and/or reduces the likelihood of moisture dripping into the cabin 230 of the aircraft 100 and/or turns gravity as a disadvantage of previous solutions into an advantage.

In some aspects of the disclosure, perforating (1012) the moisture absorbing layer 904 is performed before or after placing (1004) to create moisture control apparatus 900. In some aspects of the disclosure, perforations 902 are perforated (1012) in the body of the moisture absorbing layer 904, such as shown in FIG. 9. In some aspects, perforating (1012) the moisture absorbing layer 904 enhances evaporation of moisture trapped in the moisture absorbing layer 904, and/or increases the amount of surface area for capturing moisture, and/or reduces the weight of the moisture absorbing layer 904, and/or reduces or prevents sloshing of moisture, and/or reduces or prevents moisture "jumping" or flowing over the moisture absorbing layer 904, as examples.

It should be understood that utilization of a plurality of the solutions described herein can result in synergistic benefits realized by the use of the combination. For example, using perforations at the leading edge of the moisture absorbing layer, while also using a reverse-bevel to form a gutter, prevents sloshing of the captured moisture in the gutter as the aircraft maneuvers while also increasing time for absorption and the surface area of the moisture absorbing layer in contact with the captured water in the gutter. As another example, using wicking tape to draw moisture out of the moisture absorption layer and to enhance evaporation works well in combination with a perforated moisture absorption layer which has less material for absorption (a loss which is offset by more moisture leaving the material because of the wicking tape) but more surface area for evaporation (which is additive to the enhanced evaporation offered by the wicking tape). As another example, the reverse-bevel at the leading edge assists with spreading moisture out along the face of the moisture absorption layer, while the trailing edge barrier assists with spreading moisture out along the rear edge of the moisture absorption layer, the combination of the reverse-bevel and the trailing edge barrier more completely spreading the absorbed moisture throughout the front and back of the layer, and when further used in combination with the wicking tape increases the practical capacity of the moisture absorption layer since at least a portion of the absorbed moisture is wicked out of the material. These and other combined and synergistic effects are realized by choosing a plurality of the moisture control solutions described and/or referenced herein.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various aspects or features may be presented in a range format. It should be understood that the description in range format is merely for convenience and brevity and should not be construed as an inflexible limitation on the scope of the application. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the application, which are, for clarity, described in the context of separate aspects, may also be provided in combination in a single aspect. Conversely, various features of the application, which are, for brevity, described in the context of a single aspect, may also be provided separately or in any suitable subcombination or as suitable in any other described aspect of the application. Certain features described in the context of various aspects are not to be considered essential features of those aspects, unless the aspect is inoperative without those elements.

Although specific aspects are described in the application, it is evident that many alternatives, modifications and variations will be apparent to those skilled in the art. Accordingly, it is intended to embrace all such alternatives, modifications and variations that fall within the spirit and broad scope of the appended claims.

Citation or identification of any reference in this application shall not be construed as an admission that such reference is available as prior art to the present application, however, to the extent that any citation or reference in this application does not contradict what is stated herein, it is incorporated by reference. To the extent that section headings are used, they should not be construed as necessarily limiting.

The variations and alternatives of the present disclosure relate to, but are not limited to, components and parts designed to be positioned on the exterior or interior of objects including, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, automobiles, spacecraft, satellites, rockets, missiles, bombs, ballistic objects, etc. and therefore include manned and unmanned aircraft, spacecraft, terrestrial, non-terrestrial, and even surface and sub-surface water-borne vehicles and objects.

What is claimed is:

1. A moisture control apparatus for use with a structure within an aircraft fuselage, the structure including an upper surface, the apparatus comprising:
   a moisture absorbing layer including a moisture absorbing material, the moisture absorbing layer including a leading edge, a trailing edge, side edges, an upper surface, and, a lower surface, the moisture absorbing layer comprising a plurality of first serrations at the leading edge to prevent sloshing of the moisture that accumulates at the leading edge, and,
   a wicking layer disposed in fluid communication with the lower surface of the moisture absorbing layer, the wicking layer including a wicking layer leading edge, a wicking layer trailing edge and a wicking layer upper surface configured for capillary action of moisture from the wicking layer trailing edge towards the wicking layer leading edge, the wicking layer comprising a plurality of second serrations;
   wherein the first and second serrations are interleaved together across the moisture absorbing layer and the wicking layer,
   wherein the wicking layer leading edge is offset from the leading edge of the moisture absorbing layer such that an offset portion of the wicking layer is exposed to air to facilitate evaporation of the moisture.

2. A moisture control apparatus according to claim 1, wherein the wicking layer is configured with a plurality of alternating ridges and troughs substantially oriented in a direction substantially transverse to a major axis of the wicking layer.

3. A moisture control apparatus according to claim 2, wherein not all of the ridges have the same height.

4. A moisture control apparatus according to claim 1, further comprising an adhesive layer between the lower surface of the moisture absorbing layer and the upper surface of the wicking layer coupling the moisture absorbing layer and the wicking layer together and configured to enable fluid communication between the moisture absorbing layer and the wicking layer.

5. A moisture control apparatus according to claim 4, wherein the adhesive layer has a predetermined pattern in which the wicking layer is in fluid communication with the moisture absorbing layer at certain areas.

6. A moisture control apparatus according to claim 5, wherein the predetermined pattern is at least one of a staggered pattern, a valley pattern, and a crenellation pattern.

7. A moisture control apparatus according to claim 1, wherein the trailing edge of the moisture absorbing layer and the wicking layer trailing edge are aligned.

8. A moisture control apparatus according to claim 1, further comprising a reverse-bevel defined along the leading edge of the moisture absorbing layer, wherein the reverse-bevel and the upper surface of the structure define a gutter configured to retain liquid flowing down the upper surface of the structure.

9. A moisture control apparatus according to claim 1, further comprising a barrier positioned along at least one of the trailing edge and at at least one of the side edges.

10. A moisture control apparatus according to claim 9, wherein the barrier is moisture impermeable.

11. A moisture control apparatus according to claim 9, wherein the barrier includes a first leg connected to a second leg oriented at a non-parallel angle to the first leg, and where the first leg of the barrier extends above the upper surface of the moisture absorbing layer forming a gutter between the two legs of the barrier and the upper surface of the moisture absorbing layer.

12. A moisture control apparatus according to claim 1, wherein the moisture absorbing layer is configured with perforations through the layer.

13. A moisture control apparatus according to claim 12, wherein the perforations are located at the leading edge of the moisture absorbing layer to create the first serrations.

14. A moisture control apparatus according to claim 13, wherein the first serrations are aligned with ridges of the wicking layer to enhance fluid communication.

15. A moisture control apparatus according to claim 1, further comprising at least one of a reverse-beveled leading edge, a barrier at the trailing edge, a barrier at at least one side edge, serrations at the leading edge and perforations.

16. A moisture control apparatus according to claim 1, wherein the moisture absorbing material comprises a moisture absorbing felt.

17. A moisture control system for use within a fuselage of an aircraft, the system comprising:
   a structure within the fuselage, the structure comprising an upper surface; and,
   a moisture control apparatus for use with the structure within the fuselage, the apparatus comprising,
     a moisture absorbing layer including a moisture absorbing material, the moisture absorbing layer including a leading edge, a trailing edge, side edges, an upper surface, and, a lower surface, the moisture absorbing layer comprising a plurality of first serrations at the leading edge; and, a wicking layer disposed in fluid communication with the lower surface of the moisture absorbing layer, the wicking layer including a wicking layer leading edge, a wicking layer trailing edge and a wicking layer upper surface configured for capillary action of moisture from the wicking layer trailing edge towards the wicking layer leading edge, the wicking layer comprising a plurality of second serrations that interleave with the first serrations;

wherein the wicking layer leading edge is offset from the leading edge of the moisture absorbing layer such that an offset portion of the wicking layer is exposed to air to facilitate evaporation of the moisture.

18. The moisture control system according to claim 17, wherein the structure is a ceiling or a stowage bin of the aircraft.

19. A moisture control system according to claim 17, further comprising at least one of a reverse-beveled leading edge, a barrier at the trailing edge, a barrier at at least one side edge, serrations at the leading edge and perforations.

20. The moisture control system according to claim 17, wherein the wicking layer is configured with a plurality of alternating ridges and troughs substantially oriented in a direction substantially transverse to a major axis of the wicking layer.

* * * * *